United States Patent [19]

Schmader

[11] 4,061,314
[45] Dec. 6, 1977

[54] INPUT SECTION OF APPARATUS FOR USE IN THE CONTINUOUS PRODUCTION OF DOUGHNUTS

[76] Inventor: Richard W. Schmader, 50 Myopia Road, Winchester, Mass. 01890

[21] Appl. No.: 754,184

[22] Filed: Dec. 27, 1976

[51] Int. Cl.² ...................... B01F 15/04; A47J 37/12; B67D 5/62
[52] U.S. Cl. ..................................... 366/145; 99/354; 222/146 C; 366/160
[58] Field of Search ...................... 259/4 R, 5, 6, 7, 8, 259/9, 10, 25, 26, 21–24, 191, 192, 193; 222/146 C; 99/352, 353, 354

[56] References Cited
U.S. PATENT DOCUMENTS

| | | | |
|---|---|---|---|
| 2,953,460 | 9/1960 | Baker | 259/6 |
| 3,011,681 | 12/1961 | Kromer | 222/146 C |
| 3,472,492 | 10/1969 | Arter | 259/10 |
| 3,642,174 | 2/1972 | Cornelius | 222/146 C |
| 3,882,768 | 5/1975 | Troisi | 99/352 |

Primary Examiner—Robert W. Jenkins

[57] ABSTRACT

The input section of apparatus for use in the continuous production of dough of either one of two types has a blender into which the dry material for either type of dough is metered. First and second oil containers, a water container and a container for a yeast solution each have an outlet conduit in communication with the blender and provided with a precision pump and the water and the yeast solution are refrigerated. The outlet conduits of the containers have precision pumps and are arranged so that with either dry material, the appropriate liquids are delivered to the blender in the same relationship to the dry materials.

8 Claims, 3 Drawing Figures

INPUT SECTION OF APPARATUS FOR USE IN THE CONTINUOUS PRODUCTION OF DOUGHNUTS

BACKGROUND REFERENCES

U.S. Pat. No. 2,953,460
U.S. Pat. No. 3,708,255
U.S. Pat. No. 3,882,768

BACKGROUND OF THE INVENTION

The production of dough on a continuous basis makes quality control far more difficult than where production is on a batch basis. In brief, it is necessary, in the former case, to ensure that all the ingredients are accurately and continuously metered into a continuously operated blender to maintain the wanted formulation during a run and to maintain an adequate supply of the ingredients in condition for use throughout the run. While the problem has, of course, been recognized, the various apparatus employed in dough production have not been capable of attaining, with a sufficiently high degree of accuracy, the objective of dough uniformity when doughs of two different types were to be made.

THE PRESENT INVENTION

The general objective of the present invention is to ensure the continuous and accurate production of dough of either one of two types with its quality continuously maintained.

In accordance with the invention, this objective is attained with apparatus having a blender into which a metered supply of the dry material for a selected one of two types of dough is continuously discharged. The liquid input includes first and second oil containers, a water container and a container for a yeast solution. Each container has an outlet conduit in communication with the blender and provided with a precision pump and the water and the yeast solution are independently refrigerated. During the start of a run, the liquid ingredients are introduced into the blender before the selected dry ingredients.

One oil and the yeast solution are used with the appropriate dry material in the production of doughnut dough and the other oil and water are used with the other dry material, which contains soda, in the production of dough for so-called "cakes". In order to ensure proper mixing of the appropriate wet and dry ingredients for both types of dough, the conduits for the wet ingredients for both dough types are so placed in communication with the blender that both oils have the same relationship to the appropriate dry material as do the corresponding other two liquid ingredients.

BRIEF DESCRIPTION OF THE DRAWINGS

A preferred embodiment of the invention is illustrated by the accompanying drawings of which

THE PREFERRED EMBODIMENT OF THE INVENTION

Figure 1:
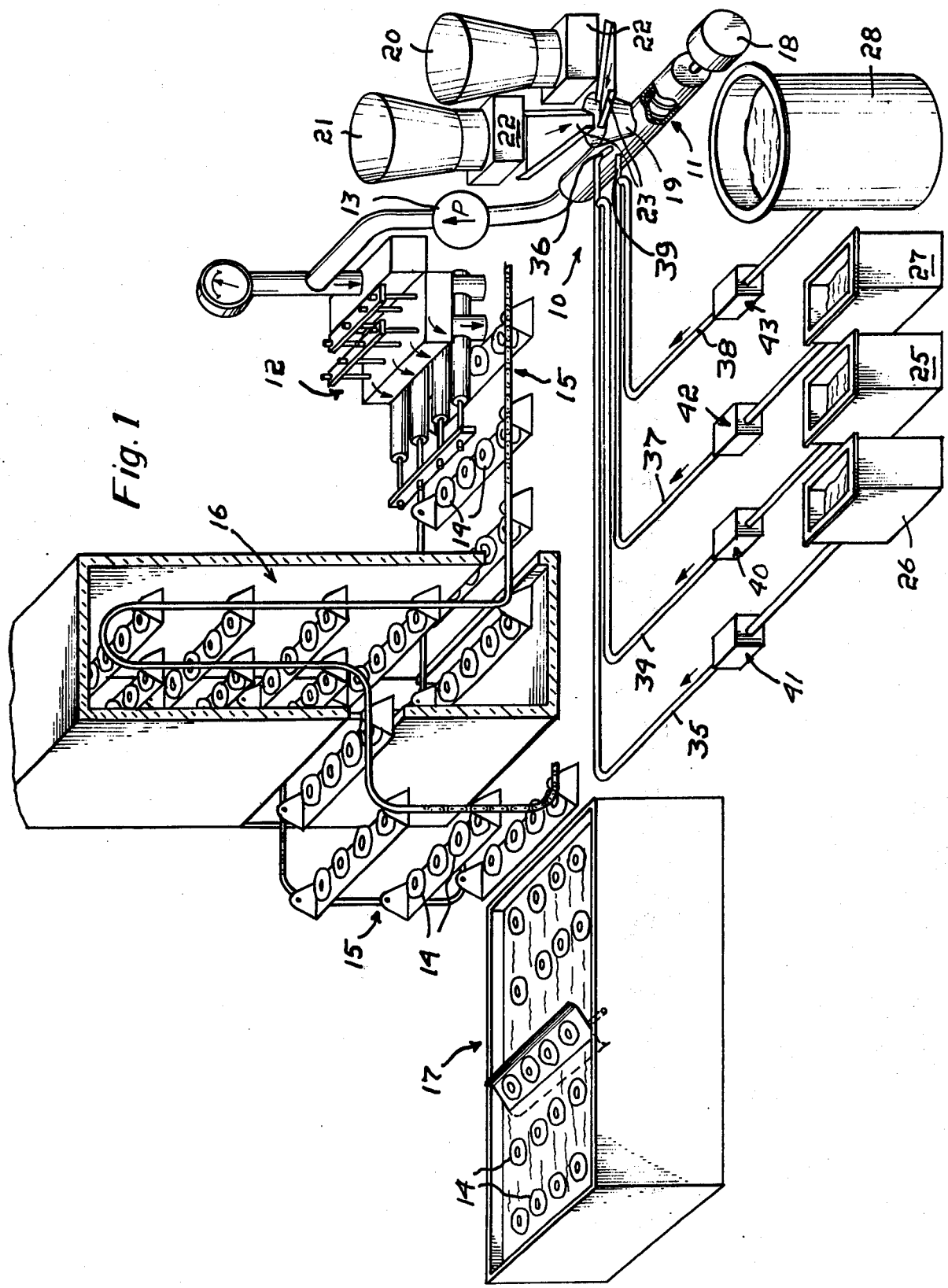
FIG. 1 is a schematic view of that part of apparatus for use in the continuous production of doughnuts that extends to the frying section from the input section.

In FIG. 1, that portion of apparatus for use in the continuous production of doughnuts is shown that includes the input section 10 having a blender, generally indicated at 11, where the dry and liquid ingredients are brought together and a depositor section 12 to which the dough is delivered by a pump 13 and at the section 12, shaped articles shown as doughnuts 14, are formed and deposited on a conveyor 15. The apparatus also includes a proofer section 16 through which the doughnuts are carried by the conveyor 15 and a fryer section 17 into which the doughnuts are discharged. The depositor section 12 is or may be of the type disclosed in U.S. Pat. No. 3,708,255 and the proofer section is or may be in accordance with U.S. Pat. No. 3,882,768. The remaining sections of the apparatus, not shown, are concerned with the further treatment of cooked articles, glazing and racking, for examples.

The blender 11, the drive for which is generally indicated at 18, has a hopper 19 opening into its auger-type feed. Above the hopper 19 there are containers 20 and 21 each opening into a motor driven metering device 22 which, when in use, continuously discharges a constant volume of a dry ingredient at a constant rate into the hopper 19 via a slide 23. The container 20 is for a flour or flour mix where the doughnuts are to be yeast-raised and the container 21 is for a flour or flour mix containing soda.

Figure 2:
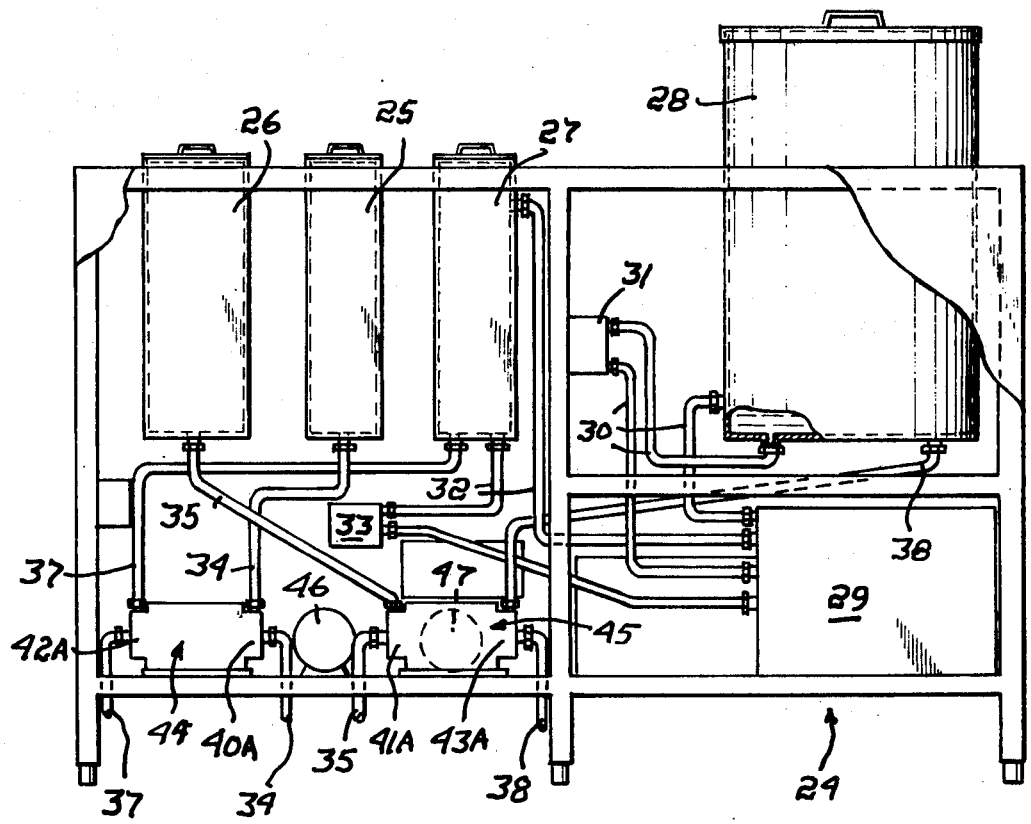
FIG. 2 is a side view of the liquid input unit.

The liquid input, generally indicated at 24 in FIG. 2, has an insulated chamber or cabinet having first and second containers 25 and 26, each for an oil different from that stored in the other, and provided with heating means, not shown, a container 27 for water and having a float controlled inlet (not shown) and a relatively larger container 28 for a yeast solution. The amount of oil used is small, say 10% of the volume of water or of the yeast solution that is to be used. The chamber 24 also is provided with a refrigerator generally indicated at 29. The yeast solution container 28 has a conduit 30 including a thermostatically controlled circulating pump 31 and a coil (not shown) within the regrigerator 29 thus enabling the yeast solution to be maintained at a selected and substantially constant reduced temperature in the approximate range of from 35° – 40° F. Similarly, the water container 27 has a conduit 32 including a theremostatically controlled water circulating pump 33 and a coil (not shown) within the refrigerator thereby enabling the temperature of the water to be maintained at a selected and substantially constant temperature, typically in the neighborhood of 50° F.

The oil containers 25 and 26 have outlet conduits 34 and 35, respectively, placed in communication with the interior of the blender 11 by a common inlet 36 so that, in either case, oil is delivered into the blender the same distance from the hopper 19. Similarly, the water container 27 and the yeast solution 28 have outlet conduits 37 and 38, respectively, and placed in communication with the interior of the blender 11 by a common inlet 39.

The flow through each container outlet is controlled by a precision pump. In FIG. 1, the precision pumps and their motors for the conduits 34, 35, 37, and 38 are indicated generally at 40, 41, 42, and 43, respectively. The oil in the container 26 is to be used with the yeast solution and the dry ingredients in the container 20 and the oil in the container 25 with water and the dry ingredients in the container 21. As shown in FIG. 2, two precision pumps, generally indicated at 44 and 45 driven by motors 46 and 47, respectively, may be used. The pump 44 has sections 40A and 42A, the output of each of which is adjustable independently of the other and the pump 45 has sections 41A and 43A with the output of each section adjustable independently of the other.

Figure 3:
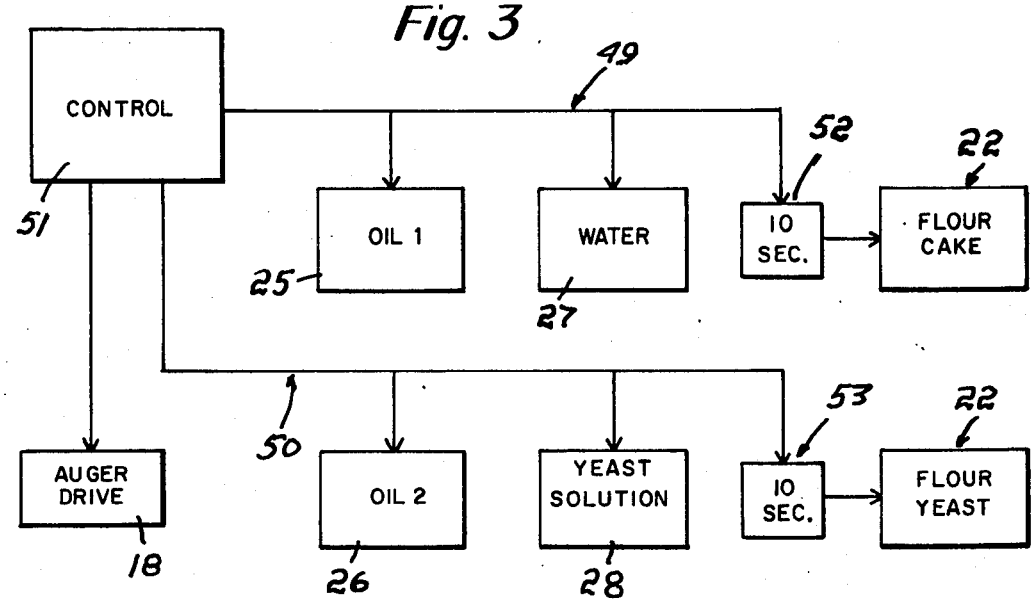
FIG. 3 is a block diagram of the motor circuitry.

In practice, the liquid ingredients for either type of dough are introduced into the blender 11 before the appropriate dry ingredient is discharged into the hopper 19. This result is attained, see FIG. 3, with circuits 49 and 50 controllable from a panel 51, the circuits 49 including the motor or motors in control of the precision pumping through the conduits 34 and 37, a time delay 52 and the motor of the metering device 22 in control of the container 20. The circuit 50 includes the motor or motors in control of the precision pumping through the conduits 38 and 39, a time delay relay 52 and the motor of the metering device 22 in control of the container 21. The relays 52 and 53 provide the desired short (ten seconds by way of example but not of limitation) delay between the introduction into the blender 11 of selected liquid ingredients and the introduction therein of the appropriate dry ingredient.

From the foregoing, it will be apparent that the input can be quickly shifted to provide whichever ingredients are wanted for dough production with the assurance that the liquid ingredients are in condition for use, that all ingredients are accurately metered, and delivered to the blender 11.

I claim:

1. An input section for apparatus for use in the continuous production of dough of either one of two different types and having a blender and two containers, each for the dry ingredient for a particular one of said dough types and having a motor driven metering device discharging into said blender, said input section including first and second oil containers, each for an oil appropriate for use with a particular one of said dry ingredients, a water container, and a container for a yeast solution, the water for use with one dry ingredient and the yeast solution for use with the other ingredients, thermostatically controlled means to refrigerate said water and thermostatically controlled means to refrigerate said solution, outlet conduits connectable to said blender, one for each container and in communication therewith, each conduit including a metering pump.

2. The input section of claim 1 in the thermostatically controlled means to refrigerate the water and the thermostatically controlled means to refrigerate the yeast solution each include an external circulating conduit, a thermostatically controlled circulating pump and a cooling section in said circulating conduit and refrigeration means inclusive of both sections.

3. The input section of claim 1 and an outlet to which the outlet conduits of two oil containers are connected and an outlet to which the outlet conduits of the water container and the yeast solution container are connected, said outlets connectable to the blender.

4. An input section for apparatus for use in the continuous production of dough of either one of two different types, said section including a blender, two containers, each for a dry ingredient for a particular one of said dough types and including a metering device, means to introduce either metered dry material into said blender, first and second oil containers, each for an oil appropriate for use with a particular one of said dry ingredients, a water container and a container for a yeast solution, thermostatically controlled means to refrigerate the water in said water container, thermostatically controlled means to refrigerate the yeast solution, outlet conduits, one for each container and including a metering pump, and said outlet conduits arranged in a manner such that both liquids for use with each dry ingredient are in communication with the blender in the same relationship to the means by which the appropriate dry ingredient is introduced into the blender.

5. The input section of claim 4 in which the means to introduce the dry materials into the blender includes a hopper common to both metering devices.

6. The input section of claim 5 in which the outlet conduits of the two oil containers include a common connection with the blender and the outlet conduits of the water container and the yeast solution container include a common connection with the blender.

7. The input section of claim 4 in which the liquid for each type of dough is introduced ahead of the appropriate dry ingredient.

8. The input section of claim 7 in which the connections of the liquid ingredients with the blender are downstream of the hopper, each pump and each metering device include motors, and the appropriate motors for each type of dough are in circuits and each circuit includes a time delay relay in control of the motor of the appropriate metering device.

* * * * *